United States Patent [19]

Kumasaka et al.

[11] Patent Number: 4,559,572
[45] Date of Patent: Dec. 17, 1985

[54] MAGNETIC HEAD AND METHOD OF FABRICATING SAME

[75] Inventors: Noriyuki Kumasaka, Ome; Hideo Fujiwara, Tokorozawa; Shigekazu Otomo, Sayama; Takeo Yamashita, Hachioji; Shinji Takayama, Mitaka; Noritoshi Saito, Hachioji; Nobuo Kobayashi, Kokubunji; Mitsuhiro Kudo, Tokyo, all of Japan

[73] Assignee: Hitachi, Ltd., Tokyo, Japan

[21] Appl. No.: 575,704

[22] Filed: Jan. 31, 1984

[30] Foreign Application Priority Data

Feb. 4, 1983 [JP] Japan .................................. 58-16067

[51] Int. Cl.⁴ ............................................. G11B 5/12
[52] U.S. Cl. ..................................... 360/110; 360/119
[58] Field of Search ........................ 360/110, 119–121, 360/122, 125–127

[56] References Cited

U.S. PATENT DOCUMENTS 3,354,540 11/1967 Duinker ........................... 360/119 X
3,369,292 2/1968 Manders ........................... 360/119 X
4,361,860 11/1982 Nozawa ............................... 360/120

*Primary Examiner*—John H. Wolff
*Attorney, Agent, or Firm*—Antonelli, Terry & Wands

[57] ABSTRACT

A magnetic head core and a method of fabricating same, wherein a magnetic circuit is constituted by a pair of magnetic films having a V-shaped cross section which face each other at each protrudent section through the gap material. The cross-sectional portion of the V-shaped film is exposed to the surface facing the magnetic recording medium. The protrusions of the magnetic film pair have tip planes parallel to each other and substantially perpendicular to the moving direction of the magnetic recording medium. The tip plane has a width defined by the line of intersection between the plane and the surface facing the magnetic recording medium in correspondence to the recording track width. At least one of the magnetic films has a window for winding an excitation coil. The magnetic film is formed on the non-magnetic protection member having a V-shaped protrusion. The magnetic head has superior recording-and reproducing characteristics in a wide frequency band with less rubbing noise, high wear-resistivity and high productivity, and operates without the pseudo gap effect. The magnetic head core is fabricated through the steps of forming a coil winding groove in the gap forming plane of a non-magnetic core block, forming a number of parallel grooves perpendicularly to the winding groove so that a number of V-shaped protrusions are produced, forming a magnetic film on the surface of the protrusions, forming a gap plane after the magnetic film has been coated with non-magnetic material, and splitting the block and then combining the two core blocks to complete a magnetic head core.

6 Claims, 19 Drawing Figures

MAGNETIC HEAD AND METHOD OF FABRICATING SAME

The present invention relates to a magnetic head suitable for use in combination with magnetic recording medium with high coercive force and, particularly, to a magnetic head suitable for recording and reproduction of signals on magnetic recording medium with high coercive force using a short recording wavelength by forming the head with magnetic alloy films having high saturation flux density.

The following references are cited to show the state of the art: (1) Japanese Patent Application Laid-Open No. 25409/78, (2) Japanese Patent Application Laid-Open No. 58824/80, and (3) Japanese Patent Application Laid-Open No. 124112/81.

The conventional magnetic heads, however, do not fulfill the requirements of productivity and performance, as will be described.

The present invention contemplates to provide a magnetic head which exhibits satisfactory recording and reproduction characteristics in the wide frequency range, high resistivity of wear with less rubbing noise, and is suitable for mass production, and also to provide a method of fabricating the head core.

In order to attain the above objective, the inventive magnetic head core has the structure featuring: (1) a pair of magnetic films are formed on two pieces of non-magnetic protection material having a protrusion in cross section exposed to the surface facing the magnetic recording medium, (2) the pair of magnetic films have a protrusion in cross section exposed to the surface facing the magnetic recording medium in correspondence to the protrusion of the non-magnetic protective member, (3) the protrusions of the magnetic film pair have tip planes parallel to each other and substantially perpendicular to the moving direction of the magnetic recording medium, (4) both magnetic films face each other at their tip planes through the non-magnetic gap material, (5) the tip plane intersects the plane facing the magnetic recording medium in a width substantially equal to the recording track width, and (6) at least one of the magnetic films has a window for winding the excitation coil.

Accordingly, in the inventive magnetic head, the magnetic circuit is formed by magnetic films with high saturation flux density, and the magnetic films are enclosed by non-magnetic protective material which reduces the rubbing noise and has resistivity to wear comparable with that of ferrite so that the head has an increased service life. The magnetic films intersect askew the facing plane, i.e., the functional gap plane, thereby eliminating portions which work as a pseudo gap. Moreover, the inventive magnetic head can be fabricated using the thin film forming technology, making it suitable to be put in the mass production line. Particularly, the magnetic head is featured in that the confronting surfaces of the head have a flat section substantially in correspondence to the recording track width, causing a pair of V-shaped magnetic films to face each other at their protrudent sections through the non-magnetic gap material, a magnetic circuit is formed with a winding window provided in at least one of the magnetic films, and the films are formed on the non-magnetic protection members. In manufacturing, a number of grooves are formed in a large non-magnetic substrate to make ridge sections of protecting material with a magnetic film formed on the surface thereof, each ridge section being used as facing sections at the gap. This allows the most of the conventional fabricating process for ferrite magnetic heads to be used directly in the mass production of magnetic head cores. The sum of the thickness of magnetic films formed on both sides of the ridge section determines the recording track width, that allows the achievement of desired thickness in a shorter time than in the case of the conventional magnetic head core of the type shown in FIG. 1 in which a planar magnetic film is formed. In case a magnetic head having the azimuth angle, the tip plane of the ridge section of each magnetic film is not exactly perpendicular to the moving direction of the magnetic recording medium, but has an azimuth angle $\alpha$ relative to the plane perpendicular to the moving direction of the recording medium. In this case, the line of intersection between the tip plane and the plane facing the recording medium projected on the above-mentioned perpendicular plane determines by its length the recording track width, and the width of the tip plane shown by the line of intersection, per se, does not accurately correspond to the track width.

The magnetic film may be of any high permeability material providing a high saturation flux density (preferably 8000 Gauss or more) and near-zero magnetostriction. Some examples of the film material are Fe-Si alloy, Fe-Al-Si alloy (so-called sendust alloy), Ni-Fe alloy (so-called permalloy alloy), and various high-permeability amorphous alloys. The material is desired to have as high permeability as possible, and it should be at least 500 at 5 MHz. The film may be of a lamination of non-magnetic insulation layers of, for example, $SiO_2$ or $Al_2O_3$ in a thickness of 100 Å to 1 $\mu$m and a magnetic layers of the same material as of the above-mentioned magnetic film overlapping each other. It is known that a lamination of magnetic and non-magnetic layers overlaying each other provides improved magnetic characteristics.

The magnetic film has a thickness approximately half the recording track width, and it is determined depending on the track width of the magnetic head and the thickness of the V-shaped ridge section of the film measured in the moving direction of the recording medium (i.e., dimension $t_m$ in FIG. 6). The V-shaped ridge section of the magnetic film is generally set to 0–50 $\mu$m.

The protection member on which the magnetic film is formed is generally a wear-resistant non-magnetic substrate made of non-magnetic ferrite, $Al_2O_3$, high fusion point glass, or common ceramics. The magnetic films formed on the surface of a pair of V-shaped grooves in the non-magnetic substrate are further coated with a non-magnetic protection material so as to enhance the wear-resistivity of the magnetic head, and this is also effective for preventing the reaction between the magnetic film and glass in the glass bonding process and the like during the head fabricating process.

In addition, the provision of a high-conductivity material such as Cu, Al and CuAg on the upper surface or the upper and lower surfaces of the magnetic film reduces the leakage flux at portions other than the gap.

The foregoing inventive magnetic head can readily be fabricated by the method of manufacturing including the sequential steps of: (1) forming a groove which will become a window for winding in the surface of a non-magnetic block for producing a number of head cores, (2) forming a plurality of parallel groove pairs at least deeper than the groove for the winding window in the surface used to form a gap on the non-magnetic block such that the grooves intersect the winding groove at substantially right angles and has a central ridge between adjacent grooves, (3) coating a high permeability magnetic material on at least the groove surface of the gap forming surface of the non-magnetic block, (4) filling the grooves having a coating of the magnetic film with a non-magnetic material, (5) removing unnecessary portions of the non-magnetic material and magnetic film so as to expose a gap forming surface having a specified recording track width, (6) cutting the block into a pair of magnetic head core blocks, (7) forming a non-magnetic layer with a specified thickness on at least one gap forming surface of each core block pair, (8) integrating the pair of core blocks so that their gap forming surfaces face each other, and (9) cutting the integrated block at certain positions into a number of magnetic head cores.

In step (2), the V-shaped groove is formed such that it runs longitudinally from one ridge to another ridge of the gap forming surface of the block with a depth larger than that of the winding groove formed in step (1).

In step (3), a non-magnetic protection film may be formed over the upper surface after the magnetic film has been formed, so that the magnetic film is protected during the head fabricating process.

Also in step (3), the upper surface or the upper and lower surfaces of the magnetic film may be coated with a high-conductivity non-magnetic metal, so that the leakage flux at portions other than the gap can be prevented. Moreover, the metallic film may further be coated with a non-magnetic insulation film.

In step (4), molten glass may be used as a non-magnetic filler, or the grooves may be filled by sputtering.

It should be appreciated that the conventional technology can be applied to whatever not described in this specification for accomplishing the inventive magnetic head and its fabricating method. The sequence of steps in fabricating magnetic head cores is not limited to that described above.

For a better understanding of the present invention, reference will first be made to the conventional magnetic head cores.

Figure 1:
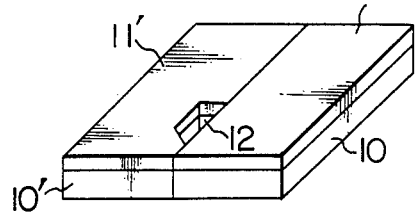
FIGS. 1 and 2 are perspective views of the conventional magnetic head.
Figure 2:
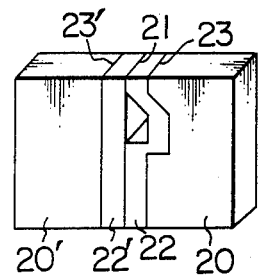

Conventionally, magnetic head cores with high saturation flux density have been made of bulk material of alloy such as sendust (Fe-Al-Si). The use of a metallic magnetic material for head cores has posed a problem of eddy current loss, and a sufficient permeability has not been obtained in the high frequency region. On this account, many attempts have been made to form laminated core base in which magnetic films and insulation films are laminated alternately by utilization of thin film forming technology. Examples of such head cores are shown in FIGS. 1 and 2. In FIG. 1, showing one of them, magnetic alloy films 11 and 11' are formed on non-magnetic substrates 10 and 10', respectively, by the known thin film forming method. Then, the material is divided and a winding window 12 is formed in it, and after the gap-forming plane has been polished, these sections are joined through a non-magnetic film to form a magnetic head core or a core block which is then cut into few head cores. Such planar formation of head cores needs the one-to-one facing process, resulting in a lower productivity and variation of characteristics among products.

Another example shown in FIG. 2 is compound head core of magnetic alloy film and ferrite, in which only portions around a gap 21 are formed of magnetic films 22 and 22' with high saturation flux density so that the portions around the gap of the conventional ferrite cores 20 and 20' are not saturated magnetically. This type of head cores provides significantly improved productivity as compared with the previous example, but the following negative characteristics have been found. Namely, the most part of the compound head core is made of ferrite, as mentioned above, which causes a large rubbing noise, particularly in the high frequency region (above 8 MHz). Due to ferrite used in most part of the head core, the excitation coil has a larger inductance, and the number of turns of the coil is limited. In addition, if boundaries 23 and 23' between the ferrite and magnetic films have portions parallel to the gap 21, they work disadvantageously as pseudo gaps.

The present invention will now be described with reference to the drawings.

EMBODIMENT 1

Figure 3:
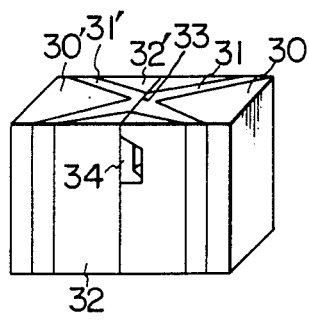
FIGS. 3 and 4 are perspective views of the magnetic heads embodying the present invention.

In FIG. 3 showing an example of the inventive magnetic head core, reference numbers 30 and 30' denote core protection materials made of non-magnetic material. Since wear-resistivity is a key feature of this section, a material having a thermal expansion coefficient similar to that of the magnetic film material is selected from non-magnetic ferrite, ceramic, hard glass, etc. In this embodiment, a material having a thermal expansion coefficient of $110-140 \times 10^{-7}/°C$. is used. Reference numbers 31 and 31' denote magnetic members principally forming the head core, and they are made of crystalline alloy of Fe-Si, Fe-Al-Si or Ni-Fe, or amorphous alloy (Fe-Co-Si-B family, Co-Mo-Zr family, Co-Nb-Zr family, Co-W-Zr family, Co-Cr-Zr family, Co-Zr-B family, or Co-Ni-Zr family). The material has a composition of substantially zero-magnetostriction, and is formed by sputtering, vacuum deposition, or the like. The present embodiment employs the sputtering method. Reference numbers 32 and 32' are protection members for the core and magnetic films, and they are formed by filling molten glass.

Reference number 33 denotes a gap section arranged in such a way that a pair of V-shaped magnetic films having a flat section of the recording track width face each other at each convex section through a non-magnetic film extending for the gap width. This arrangement avoids parallelism between the gap plane and other end sections, allowing the reduction of crosstalk by virtute of the azimuth loss. Reference number 34 denotes a winding window. The excitation coil is not shown in FIG. 3 for purposes of simplicity.

EMBODIMENT 2

Figure 4:
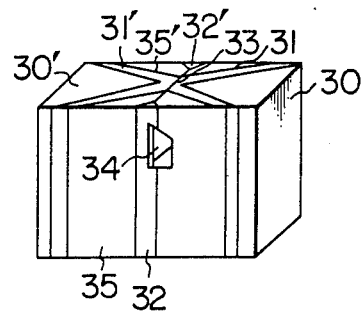

The structure of this embodiment shown in FIG. 4 is basically identical to that of the previous embodiment. After magnetic members 31 and 31' have been formed, non-magnetic members 35 and 35' are provided by high rate sputtering, and they are joined together with parts 32 and 32' of the head core pieces. This arrangement is effective for protecting the magnetic films and enhancing the wear resistivity of the head, and allows filling of high fusion point glass. Non-magnetic material other than glass may also be used. The glass junctions 32 and 32' may be replaced with the junction of the gap plane and part of the winding window when required. The non-magnetic members 35 and 35' are made of $Al_2O_3$ in this embodiment. The remaining portions are identical to those of FIG. 3 with the same reference numbers. Also in FIG. 4, the excitation coil is not shown for purposes of simplicity.

EMBODIMENT 3

The following describes the steps of the method of fabricating the magnetic head according to one embodiment of the present invention with reference to FIGS. 5a–5g.

Figure 5A:
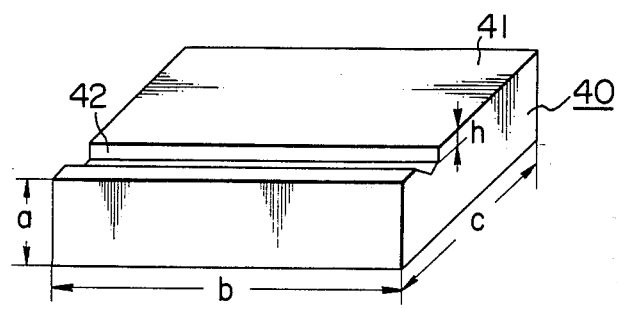
FIGS. 5a–5g are illustrations used to explain each step of fabricating a magnetic head core according to one embodiment of the invention.
Figure 5B:
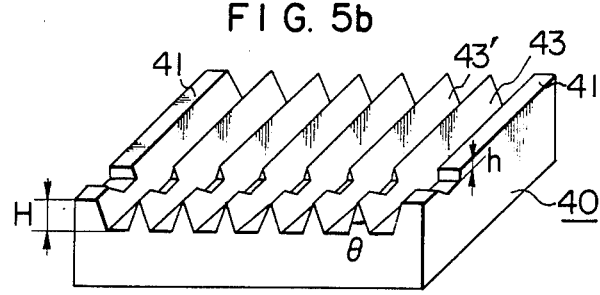
Figure 5C:
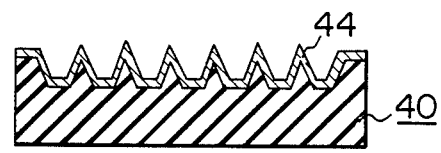
Figure 5D:
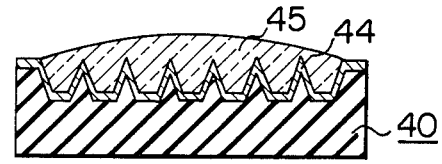
Figure 5E:
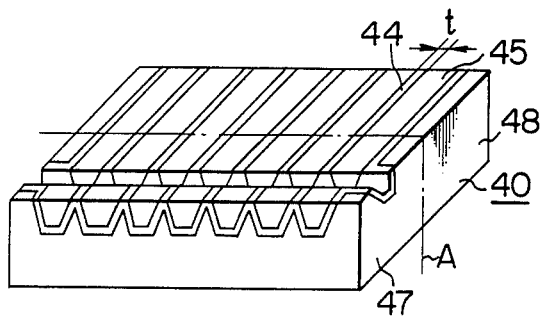
Figure 5F:
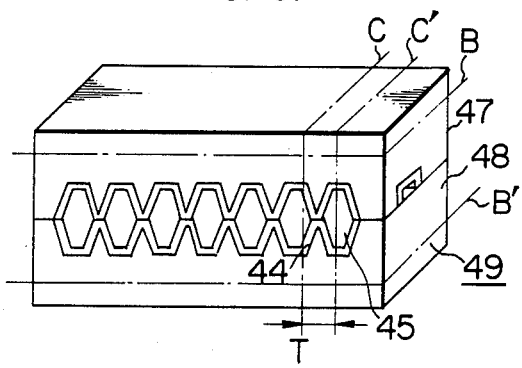

(1) In the first step shown in FIG. 5a, a groove 42 for placing an excitation coil is formed on a plane 41, which will become the gap plane, of a block 40 made of non-magnetic ferrite ($ZnO.Fe_2O_3$ in this embodiment). The groove is formed using a metal bonded brades or resinoid bonded brades with its tip formed in trapezoid. A high-speed dicing saw and the like is used for machining. The groove has a depth h of 0.3 mm. The non-magnetic core block has a shape to provide a pair of core blocks. The block has dimensions: a=2 mm, b=15 mm, and c=6 mm. In the following description, the machining steps shown by FIGS. 5a and 5b will be called step (a) and step (b), and so on.

(2) In step (b), pairs of parallel grooves, such as 43 and 43', are formed to produce V-shaped ridges perpendicularly to the winding groove 42 formed in the block 40. The grooves 43 and 43' has a depth H at least larger than the depth h of the winding groove 42. In this embodiment, the depth is set to H=0.4 to 1.0 mm relative to the depth of winding groove h=0.3 mm. Each ridge has a summit angle $\theta$ ranging 20° to 90°. A smaller angle is required when producing a magnetic head core with small track width. Preferably, the angle takes a value in the range of 30°–60°.

(3) In step (c), a magnetic film 44 is deposited by sputtering over the entire surface of the ridges including the bottom of the grooves which have been formed in step (b). The magnetic film is made of crystalline alloy such as Fe-Si alloy, Fe-Al-Si alloy (sendust) or Ni-Fe alloy (permalloy), or may be made of amorphous alloy such as metal-metalloid alloy being typically Co-Fe-Si-B alloy or metal-metal alloy being typically Co-Mo-Zr, Co-Nb-Zr, Co-W-Zr or Co-Ti. All of these materials are known.

An example of the method and condition of forming the magnetic film is as follows.
Deposition system: Magnetron sputtering system.
Film material: $Co_{87}Nb_5Zr_8$ amorphous alloy.
Target voltage: 1 kV.
Argon gas pressure: $5 \times 10^{-3}$ Torr.
Substrate temperature: 50°–100° C.
Deposition rate: 6 $\mu$m/h.
Film thickness: 25 $\mu$m.

Other methods such as vacuum deposition, ionplating, chemical deposition, and galvanizing may also be used, but the kind of metals is limited and the composition of material is varied significantly in these methods, and therefore, the sputtering method is most suitable. The sputtering method provides the strong adhesion of the coating material deep into the groove, and it is suited to the purpose of the present invention also from this viewpoint. More than one magnetic film and non-magnetic film may be deposited alternately to form a multi-layer film, as mentioned previously, when necessary.

(4) In step (d), the magnetic film 44 formed in step (c) is overlaid with a non-magnetic material 45 so that at least the groove sections are filled with the material. Inorganic adhesive of glass or ceramic family or hard resin is used for the non-magnetic material 45. Glass is suitable from the viewpoint of stability. For glass material, the working temperature can be set in a wide range below 800° C. when the magnetic film 44 is made of crystalline alloy. On the other hand, when the film is made of amorphous alloy, the working temperature is set at least lower than the crystallization temperature, and low fusion point glass which needs the working temperature below 500° C. should be used in general.

(5) In step (e), unnecessary portions of the non-magnetic material and magnetic film of the block processed in step (d) are removed, so that the gap forming plane of the magnetic film having a specified recording track width t is exposed. The removal process is carried out by grinding and polishing, and a mirror finished surface is produced so that the gap facing plane is formed at the same time. The track width can be set arbitrarily so far as the top of the non-magnetic member is not exposed. Next, the block 40 is cut at the position shown by the dash-dot line A into a pair of core blocks 47 and 48.

(6) In step (f), the gap forming planes (core block facing planes) of the core block pair 47 and 48 produced in step (e) are coated with non-magnetic material such as $SiO_2$ or glass to the desired thickness (about 0.25 $\mu$m) by sputtering to form gap forming films. The core blocks are positioned to face each other so that the ridge of the magnetic film has the specified track width. Then, the block is heated to the fusion point of the glass filler 45 while the pressure being applied thereto, and a junction block 49 is produced. The junction block is cut into units at positions symmetric with respect to the track section formed by the facing magnetic films as shown by the dot-dashed lines C and C', and magnetic head cores having a core width of T are produced. The upper and lower end sections of the block may be cut off at positions B and B' so as to obtain the desired core width.

Figure 5G:
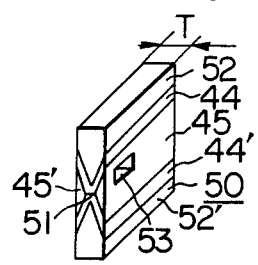

(7) FIG. 5g shows the magnetic head core 50 fabricated through the foregoing processes. In the figure, reference numbers 44 and 44' are magnetic films forming a magnetic circuit for the magnetic head, 52 and 52' are non-magnetic protection members for the head, 45 and 45' are glass fillers for protecting the side planes of the magnetic films, 51 is a gap, 53 is a winding window, and T represents the thickness of the magnetic head core.

Figure 6:
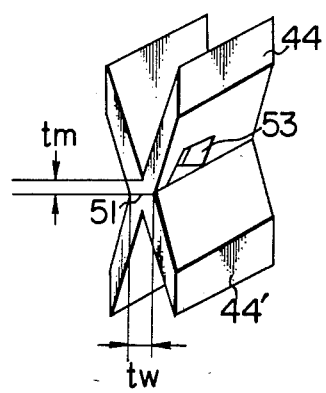
FIG. 6 is a perspective view showing the principal portion of the inventive magnetic head core.

FIG. 6 shows the principal magnetic film section taken out of the magnetic head core of FIG. 5g. A pair of V-shaped magnetic members face each other through the gap material, with the facing plane having a flat section corresponding to the track width $t_w$ which is set in this embodiment to approximately 25 μm. The magnetic film has a thickness $t_m$ of the facing section measured in the moving direction of the magnetic recording medium and it is set to 10 μm.

EMBODIMENT 4

Figure 7:
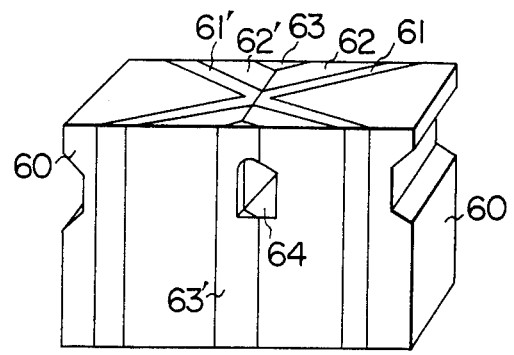
FIG. 7 is a perspective view of the magnetic head according to another embodiment of the invention.
Figure 8A:
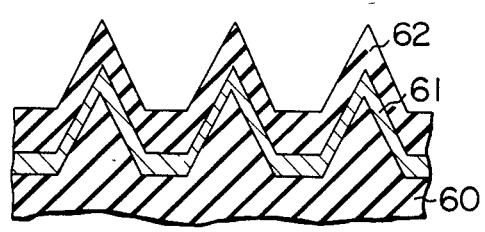
FIGS. 8a and 8b are cross-sectional views of the finished head block according to another embodiment of the invention.
Figure 8B:
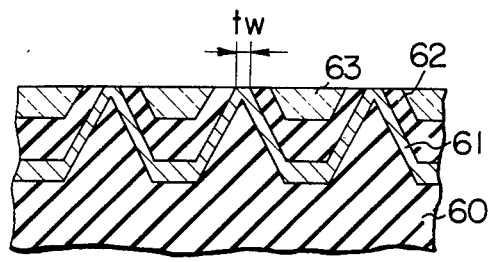

FIG. 7 shows another embodiment of the invention, in which a pair of magnetic films 61 and 61' constituting a magnetic circuit are formed on non-magnetic protection members 60 and 60' having protrusions. The magnetic films are overlaid for protection with wear-resistant, high fusion point non-magnetic material 62 and 62' by sputtering. The two core pieces are joined with bonding material 63 and 63' such as glass. Reference number 64 denotes a winding window. This arrangement facilitates the formation of tough protection film, which is effective for preventing the reaction of glass and magnetic film during the bonding process and also for finishing the end sections defining the track width accurately. The excitation coil is not shown in the figure for purposes of simplicity. FIGS. 8a and 8b show the method of fabricating the magnetic head core shown in FIG. 7. In step (a) corresponding to FIG. 8a, a non-magnetic protection member 60 is machined on the surface which will become the gap facing plane to form a number of trapezoidal grooves so that a number of ridges are formed. On the surface of the grooves and ridges a magnetic film 61 is deposited by sputtering, and it is further overlaid with an $Al_2O_3$ protection film 62. This step is carried out in correspondence to step (c) of the previous embodiment shown in FIG. 5c. In the subsequent step shown in FIG. 8b, the bottom of the grooves is filled with glass 63, and then the core block is ground and polished to provide the track width $t_w$. This step corresponds to steps (d) and (e) of the previous embodiment. Thereafter, steps (f) and (g) of the previous embodiment are followed to complete a magnetic head core. Alternatively, the portion of the bonding material 63 may be formed entirely with the protection material 62, and in this case, the gap facing plane and part of the winding window provide bonding sections. The protection members 62 and 62' are made of $Al_2O_3$, and other portions are of the same materials as used in embodiment 3.

EMBODIMENT 5

The structure according to still another embodiment of the invention is that a high-conductivity Cu layer is formed over the ridge section of the non-magnetic protection member 60 of FIG. 8a, and it is overlaid with the magnetic film 61, and thereafter another Cu layer is formed over the magnetic film 61. A non-magnetic insulation film may be formed in addition as a protection film. Then, the steps of embodiment 3 are followed to complete a magnetic head core. This arrangement is effective for reducing the leakage flux at portions other than the gap, thereby providing a high efficiency magnetic head.

EMBODIMENT 6

Figure 9A:
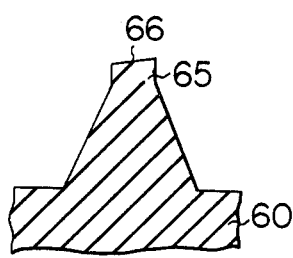
FIGS. 9a and 9b are cross-sectional views of the non-magnetic protection member according to another embodiment of the invention.
Figure 9B:
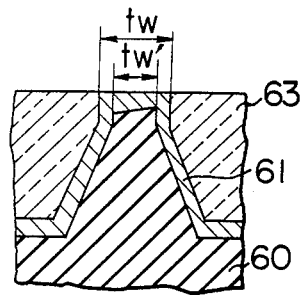

FIGS. 9a and 9b show another embodiment of the invention concerning the shape of protrusion on the non-magnetic protection member. The protrusion formed on the non-magnetic protection member 60 has a rectangular tip as shown in FIG. 9a. It is desirable in this case to make a tip plane aslant so that it does not have a parallel relationship with the gap which will be formed later. This slant plane is preferably produced in advance of the step shown in FIG. 5a. Following the step of FIG. 9a, a magnetic film 61 is formed, glass 63 is filled, and the top plane is polished through the steps of FIGS. 5c–5e sequentially, and the track width $t_w$ shown in FIG. 9b is obtained. This arrangement facilitates the attainment of the track width $t_w$ by specifying the width $t_w'$ of protrusion of the non-magnetic protection member in advance, and forming the desired magnetic film. All materials are the same as used in embodiment 3.

EMBODIMENT 7

Figure 10:
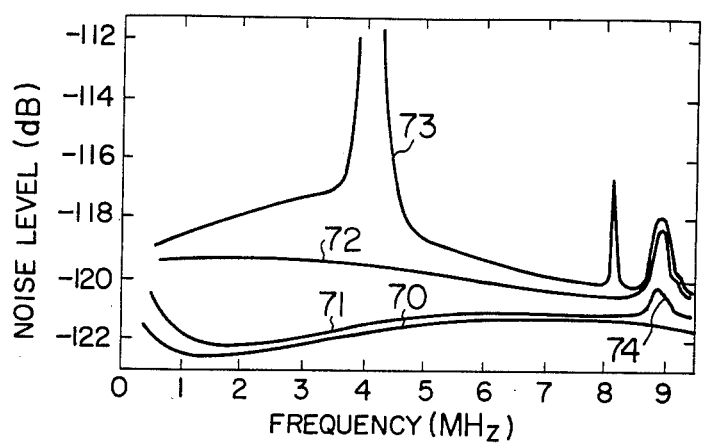
FIGS. 10 and 11 are graphs used to compare the noise levels plotted against the signal frequency exhibited by the conventional magnetic head and the inventive magnetic head, respectively.
Figure 11:
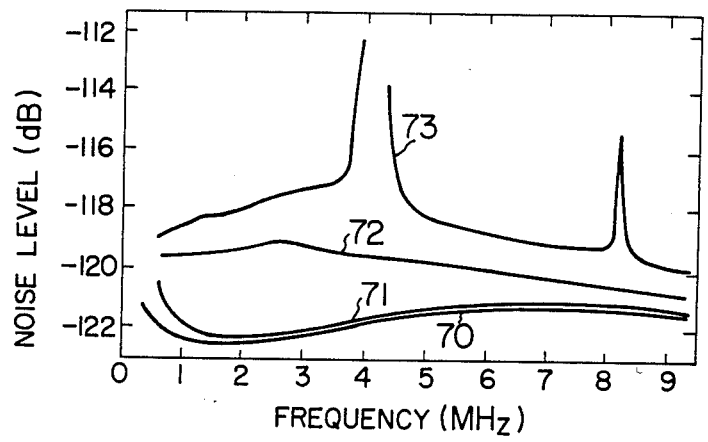

Next, the comparison of noise levels between the conventional magnetic head and the inventive magnetic head will be described in connection with FIGS. 10 and 11. FIG. 10 shows various kinds of noise level plotted against the frequency, such as, for example, of the head core structure shown in FIG. 3 with the non-magnetic protection material 30 and 30' being replaced with magnetic ferrite. The curve 70 shows the amplifier noise, 71 shows the rubbing noise, 72 shows the A.C. erasing noise, and 73 represents the total noise. The recording medium used for the measurement is a metallic tape with a coercive force of 1400 Oe. FIG. 11 is a graph of various noise levels plotted in the same way as before for the magnetic heads shown in FIGS. 3 and 4, in which the magnetic circuit is formed by the magnetic films and the non-magnetic material is added as protection members 30 and 30'. What should be noted here is a sharp increase in the rubbing noise particularly in a high-frequency region 74 of 8–9 MHz when the protection members are formed of ferrite (FIG. 10). On the other hand, almost no rubbing noise appears when the protection members are formed of non-magnetic material as can be seen from FIG. 11. Consequently, the inventive magnetic head has improved characteristics of carrier signal to noise ratio (C/N) by 1 dB or more in the high frequency region. It was also confirmed that the inventive magnetic head provides superior recording and reproducing characteristics when operated in conjunction with a high-coercive metallic tape as compared with the conventional straight type magnetic head as shown in FIG. 1.

As described above, the inventive magnetic head is constructed by combination of the magnetic material with high saturation flux density enough to record on a recording medium with high coercive force and non-magnetic protection material with high wear-resistivity by utilization of the thin film forming technology, whereby a narrow-track magnetic head of high productivity, low noise, and superior recording and reproducing characteristics is achieved. This magnetic head can readily be manufactured by the inventive method.

Obviously, many modifications and variations of the present invention are possible in the light of the above teachings. It is therefore to be understood that the invention may be practiced otherwise than those as specifically described above within the scope of the appended claims.

We claim:
1. A magnetic head comprising:
    a pair of core protection materials each of which is made of non-magnetic material and has a tapered portion defining a ridge, said core protection materials being arranged so that tips of the ridges of said tapered portions are facing towards each other; and a pair of V-shaped magnetic films which are respectively, formed on surfaces of the ridges of said pair of core protection materials, said V-shaped magnetic films being arranged adjacent to one another to form a non-magnetic gap which has substantially the same width as a recording track of a magnetic recording medium and which is not parallel to the magnetic films at edges of said magnetic films except at the gap.

2. A magnetic head according to claim 1, wherein a non-magnetic insulation film is formed on a surface of each of said magnetic films opposite to that surface of the film in contact with said core protection material.

3. A magnetic head according to claim 1, wherein a non-magnetic high-conductivity film is formed on both surfaces of each of said magnetic films.

4. A magnetic head according to claim 1, wherein a non-magnetic high-conductivity film is formed on a surface of each of said magnetic films opposite to that surface of the film in contact with said core protection material, said high-conductivity film being further overlaid with a non-magnetic insulation film.

5. A magnetic head according to claim 1, wherein in each of said magnetic films is made of high-permeability polycrystalline alloy or high-permeability amorphous alloy.

6. A magnetic head according to claim 1, wherein each of said magnetic films is made of Fe-Si alloy, Fe-Al-Si alloy or Ni-Fe alloy.

* * * * *